United States Patent Office 3,355,191
Patented Nov. 28, 1967

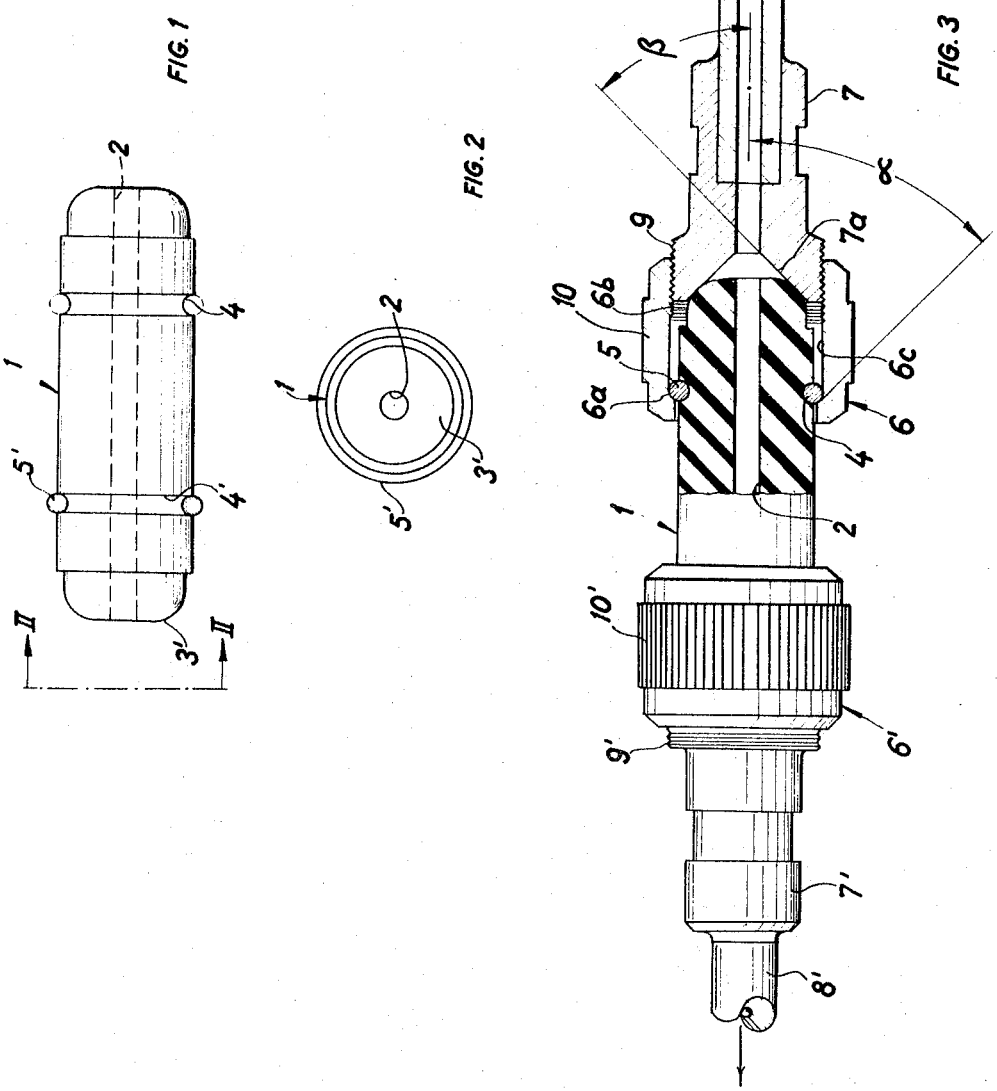

3,355,191
INSULATING JOINT
Paul Tzschirntsch, Berlin-Niederschoneweide, Germany, assignor to Veb Kabelwerk Oberspree (KWO), Berlin-Oberschoneweide, Germany, a corporation of Germany
Filed May 26, 1965, Ser. No. 458,953
5 Claims. (Cl. 285—52)

ABSTRACT OF THE DISCLOSURE

Insulating joint for interconnecting two metallic conduits, including a rigid insulating sleeve, a pair of externally threaded metallic nipples bearing coaxially upon respective ends of the sleeve and respectively secured to the conduits as terminations thereof, a pair of clamping nuts threadedly engaging the nipples, respectively, and extending over the ends of the sleeve toward each other. The sleeve is provided with a pair of axialy spaced peripheral grooves overlain by the nuts and spaced from said nipples, and a pair of metallic rings of substantially circular cross-section projectingly received in said grooves, the nuts having free ends formed with inturned lips positively engaging the rings and bearing upon them in an axially outward direction and with a radialy inward force component, the nipples having generally frustoconical recesses facing the sleeve and acommodating respective ends thereof, the ends being rounded and bearing upon the walls of the recesses.

---

My present invention relates to an insulating joint for interconnecting two metallic conduits serving for the transmission of electric energy or of fluids such as oil or pressurized gas.

In such lines it is frequently necessary to interrupt the continuity of an outer metallic sheath, serving as a screen and/or as a conductor for supervisory signals, in order to prevent undesirable transmission of electric currents over the full length of the line or to insulate a certain section thereof to which a monitoring voltage is being applied. Insulating couplings heretofore devised for this purpose, however, were not fully reliable under varying ambient conditions, e.g., when a cemented connection between metal and dielectric material was involved, or had to be made of inordinately large diameters so as to allow for the cutting of external threads into an insulating sleeve without unduly weakening it.

The general object of my invention is, therefore, to provide an insulating joint of this type which avoids the aforestated drawbacks and insures a fluidtight and mechanically strong connection even with widely changing temperatures while being of compact design and easy to install.

A more specific object of this invention is to provide a joint of this description which can be quickly assembled and disassembled, involving no adhesive bonding.

In accordance with the present invention I provide, in combination with a pair of externally threaded nipples forming the termination of respective conduit sections, a coupling sleeve of insulating material maintained in firm coaxial contact with these nipples by a pair of clamping nuts in mating engagement with the threads of the nipples, each nut having a free end which projects beyond the respective nipple and has an inturned annular lip in positive engagement with a preferably metallic ring partly projecting from an annular groove of the sleeve. Advantageously, in accordance with a more particular feature of my invention, the inturned lip is so curved or beveled that the maximum angle included between its generatrices and the sleeve axis is an acute angle substantially less than 90°, preferably between about 30° and 60°, so as to exert a camming force with a radially inward component upon the ring in response to axial stresses tending to separate the nut from the sleeve. The threaded nipple, in turn, may be similarly provided with a generally frustoconical inner surface contacting a rounded end of the sleeve for firm and fluidtight engagement therewith.

The invention will be described in greater detail with reference to the accompanying drawing in which:

FIG. 1 is a side-elevational view of a coupling sleeve adapted to be used in a joint according to my invention;

FIG. 2 is an end view of the sleeve, taken on the line II—II of FIG. 1; and

FIG. 3 shows, in elevation and partly in axial section, a complete joint incorporating the sleeve of FIGS. 1 and 2.

In FIGS. 1 and 2 I have shown a coupling sleeve 1 of dielectric plastic material, formed with a central bore 2 and with curved ends 3, 3' between which two peripheral annular grooves 4, 4' are symmetrically disposed on opposite sides of its transverse median plane. Grooves 4 and 4' are of semicircular cross-section and are designed to receive respective metal rings 5 (FIG. 3) and 5' of circular cross-section which may be shrunk into the grooves or forced over the ends 3, 3' of the sleeve by plastic deformation thereof.

As shown in FIG. 3, two metallic clamping nuts 6, 6' are loosely slid over the sleeve ends 3, 3' and are formed (as specifically illustrated for nut 6) with inturned lips 6a which contact the rings 5, 5' along complementary concave surfaces whose generatrices include a maximum angle α, here of about 45°, with the axis of sleeve 1. To facilitate the mounting of the nuts 6, 6' of the sleeve, I may first introduce only the ring 5' into its groove 4', as illustrated in FIG. 1, and thereafter slip both nuts over the end 3 of the sleeve until they clear the groove 4 whereupon the ring 5 may be inserted to lock the nuts in place. A pair of metallic nipples 7 and 7', soldered or otherwise secured to respective metallic conduits 8, 8' here shown as a pair of fluid-carrying pipes, are then brought to bear upon the ends 3, 3' of sleeve 1 so as to extend coaxially therewith. Next, the nuts 6, 6, are screwed onto the nipples 7, 7' which for this purpose are provided with male threads 9, 9' mating with the female threads 6b of the nuts which are separated by an annular clearance 6c from the lip 6a. By means of a frustoconical recess 7a, whose walls have generatrices including an angle β (here also of about 45°) with the sleeve axis, nipples 7 and 7' cammingly bear upon the somewhat resilient ends 3 and 3' of the sleeve to force the lips 6a of nuts 6 and 6' into a firm contact with the projecting portions of rings 5 and 5' whereby the latter are urged axially outwardly and are simultaneously cammed radially inwardly into their respective grooves 4, 4'. The nuts 6 and 6' have suitably milled or knurled outer surfaces 10, 10' which facilitate their threading and unthreading with reference to nipples 7 and 7'.

Naturally, a pipe joint of the character herein disclosed could also be formed between only a single conduit 8 and one end of an insulating sleeve 1, with omission of the assembly 6'-8', if the opposite end of the sleeve did not have to be joined to an extension of conduit 8 or if some other (e.g., permanent) type of connection were employed there.

My invention is, of course, susceptible of numerous modifications and adaptations without departing from the spirit and scope of the appended claims.

I claim:

1. An insulating joint for interconnecting two metallic conduits, comprising a rigid insulating sleeve, a pair of externally threaded metallic nipples bearing coaxially upon respective ends of said sleeve and respectively secured to said conduits as terminations thereof, a pair of clamping nuts threadedly engaging said nipples, respectively, and extending over the ends of said sleeve toward each other, said sleeve being provided with a pair of axially spaced peripheral grooves overlain by said nuts and spaced from said nipples, and a pair of metallic rings of substantially circular cross-section projectingly received in said grooves, said nuts having free ends formed with inturned lips positively engaging said rings and bearing upon them in an axially outward direction and with a radially inward force component, said nipples having generally frustoconical recesses facing said sleeve and accommodating respective ends thereof, said ends being rounded and bearing upon the walls of said recesses.

2. A joint as defined in claim 1 wherein said lips have inner surfaces in contact with said rings having generatrices which include a maximum angle between substantially 30° and 60° with the axis of said sleeve.

3. A joint as defined in claim 2 wherein said angle is substantially 45°.

4. A joint as defined in claim 1 wherein said walls have generatrices including an angle of approximately 45° with the axis of said sleeve.

5. A joint for interconnecting two metallic conduits, comprising a rigid synthetic-resin sleeve, a pair of externally threaded metallic nipples bearing coaxially upon respective ends of said sleeve and respectively secured to said conduits as terminations thereof, a pair of metallic clamping nuts threadedly engaging said nipples, respectively, and extending over the ends of said sleeve toward each other, said sleeve being provided near said ends with a pair of axially spaced peripheral grooves spaced from the nipples of substantially semicircular cross-section overlain by said nuts, and a pair of metallic rings of substantially circular cross-section projectingly received in said grooves, said nuts having free ends formed with inturned lips positively engaging said rings and bearing upon them in an axially outward direction and with a radially inward force component.

References Cited

UNITED STATES PATENTS

| | | | |
|---|---|---|---|
| 1,057,763 | 4/1913 | Mueller et al. | 285—254 X |
| 2,333,470 | 11/1943 | Cowles | 285—334.4 X |

FOREIGN PATENTS

| | | |
|---|---|---|
| 334,284 | 9/1930 | Great Britain. |
| 671,480 | 5/1952 | Great Britain. |

CARL W. TOMLIN, *Primary Examiner.*

EDWARD C. ALLEN, *Examiner.*

R. G. BERKLEY, *Assistant Examiner.*